US006804169B2

(12) United States Patent
Addy et al.

(10) Patent No.: US 6,804,169 B2

(45) Date of Patent: Oct. 12, 2004

(54) SECURITY SYSTEM WITH PORTABLE TIMEPIECE AND METHODS FOR USE THEREWITH

(75) Inventors: Kenneth L. Addy, Massapequa, NY (US); Gordon Hope, Jr., Miller Pl, NY (US); Edward Daly, Bristol, CT (US); Richard Ciervo, New Britain, CT (US)

(73) Assignee: Honeywell International Inc., Morristown, NJ (US)

( * ) Notice: Subject to any disclaimer, the term of this patent is extended or adjusted under 35 U.S.C. 154(b) by 226 days.

(21) Appl. No.: 09/876,857

(22) Filed: Jun. 7, 2001

(65) Prior Publication Data

US 2002/0186620 A1 Dec. 12, 2002

(51) Int. Cl.$^{7}$ ......................... G04B 47/00; G04C 11/02; H04Q 1/00; H04Q 7/00; G08C 19/00

(52) U.S. Cl. .......................... 368/10; 368/47; 340/5.63; 340/7.1; 340/539.11; 340/825.72

(58) Field of Search ........................... 340/825.22, 5.06, 340/5.61, 5.63, 7.1, 539.22, 825.44, 825.72, 506, 539.1, 539.11; 368/10, 46, 47, 52

(56) References Cited

U.S. PATENT DOCUMENTS 5,319,698 A * 6/1994 Glidewell et al. ............ 379/39
5,412,377 A * 5/1995 Evans et al. ........... 340/825.22
5,600,711 A * 2/1997 Yuen ..................... 379/102.03
5,805,530 A * 9/1998 Youngberg ................... 368/47
5,929,771 A * 7/1999 Gaskill ...................... 340/7.54
6,282,152 B1 * 8/2001 Kurple ........................ 368/10
6,445,291 B2 * 9/2002 Addy et al. ............ 340/539.22

* cited by examiner

*Primary Examiner*—Vit W. Miska
(74) *Attorney, Agent, or Firm*—Anthony R. Barkume, P.C.

(57) ABSTRACT

The present invention utilizes the advantages provided by a portable, wearable timepiece such as an electronic wristwatch for integration with a security system and performing various functions as a result of the timekeeping integration. First, the control panel of the security system may be synchronized by the timepiece, either automatically or when selected by a user. Second, the timepiece may be programmed to send certain commands to the control panel at certain times, such as a command to arm the system at 11:00 PM every night. Third, the timepiece can be used to send commands to the control panel on detection of a button press, but only after a countdown delay specified by the user. This gives the user the ability to press a system arm command that would only be sent after a delay of, for example, 15 seconds.

22 Claims, 3 Drawing Sheets

SECURITY SYSTEM WITH PORTABLE TIMEPIECE AND METHODS FOR USE THEREWITH

FIELD OF THE INVENTION

This invention relates to a security system that interoperates with a portable, wearable timepiece such as a wristwatch.

BACKGROUND OF THE INVENTION

A recent innovation in security applications is the use of "wireless keys", which are small remote control devices, typically attached to a key-fob. These devices have become popular for remote arming and disarming as well as remote control of other devices via the wireless receiver and central control unit. For example, ADEMCO 5800 series of products, specifically the 5881 receiver which receives messages from a 5804 wireless key and passes the complete message to the control panel for some resultant action. In addition two way devices, e.g. ADEMCO 5804BD send information to the system then receive an acknowledgment back via the system bus and central transmitter module, 5800TM, which transmits to a receiver contained within the 5804BD.

Thus a basic system consists of a central control unit, a wired console (on the system bus), a wireless receiver (also on the system bus), a central transmitter module (also on the bus), and various wireless sensors and wireless control transmitters in communication with the control unit via the receiver, bus and transmitter module.

One of the major advantages of a wireless system is that there is lower installation time since the sensors do not require wiring back to the control panel. Additionally the use of wireless-key transmitters for remote control adds convenience and provides for improved security, e.g. system status can be interrogated before entering the protected premises, lights may be activated etc.

Key-fob transmitters have proven to be successful in the field over recent years, although the user is required to carry an extra device on a key-chain. Since there is a very high proportion of the population which wear or carry timepieces such as watches, it would be advantageous to incorporate the security transmitter into a watch. There are clearly many advantages of combining a time-of-day (TOD) device with a security control transmitter which adds to end user security and convenience. For example, it is advantageous to allow a user to program the watch with a schedule of events that occur at predetermined times so that the user does not have to change the programming information that resides in the control panel (which is usually programmed by a qualified installer and not meant to be tampered with by a user of the system).

It is therefore an object of the present invention to provide a combination device which includes the functionality of a remote control security transmitter with an electronic watch.

It is a further object of the present invention to provide improved security by means of a combined security transmitter and watch.

It is a further object of the present invention to provide improved security system time-keeping by means of a combined security transmitter and watch.

It is a further object of the present invention to provide improved end-user convenience by means of a combined security transmitter and watch.

SUMMARY OF THE INVENTION

The present invention utilizes the advantages provided by a portable, wearable timepiece such as an electronic wristwatch for integration with a security system and performing various functions as a result of the timekeeping integration.

In one major aspect of the invention, the security system includes a portable, wrist-wearable timepiece which has a timekeeping circuit for calculating a time of day and for generating a time indicating signal representing the time of day. The timepiece also includes wireless transmitter means for transmitting data signals and processing means adapted to cause the transmitter means to transmit a time synchronization signal. The security system further includes a control panel with a clock function, a wireless receiver in communication with the control panel for receiving a time synchronization signal from the wireless transmitting means, and a plurality of sensor devices in communication with the control panel. In this aspect of the invention, the control panel is adapted to synchronize the clock function with the time synchronization signal received via the wireless receiver so that the timepiece and the control panel are in time synchronization as a result thereof.

The time synchronization signal may be transmitted by the transmitter at a predetermined time, and the control panel synchronizes the clock function to the predetermined time when the time synchronization signal is received via the wireless receiver. The time synchronization signal may be transmitted by the transmitter at the same predetermined time every day. For example, the system could be configured to perform this synchronization at 12:00 AM every day. In the alternative, the time synchronization signal may include the time indicating signal, in which case the control panel synchronizes the clock function with the time synchronization signal by setting the clock function to the same time as indicated by the time indicating signal. The time synchronization signal may be transmitted after the occurrence of a predetermined event. The timepiece may also include a user input button, and the time synchronization signal may be transmitted as a result of the detection by the processing means of a user selecting the user input button.

In a second major aspect of the invention, the timepiece may also include a memory for storing user-defined event records, each of the event records including command data indicative of a command and time data indicative of the time that the associated command should be executed. In this case, the timepiece has processing circuitry that is programmed to determine when time data contained in any of the event records matches the time indicating signal and then cause the transmitter means to transmit a command data signal that includes the associated command data. The control panel is also adapted to perform a function specified by the command data received via the wireless receiver. For example, the function performed by the control panel may be the arming of the security system at a predetermined time specified by the associated time data.

The security system may also include output devices in communication with the control panel, and the function performed by the control panel may be the triggering of an output device at a predetermined time specified by the associated time data. For example, the output device may be a light, and the light may be turned on or off by the control panel.

In a third major aspect of the invention, the memory may have user-defined event records that include command data indicative of a command and delay data indicative of a delay time associated with the command. The processing means is programmed to determine when a user input button has been activated, determine which event record is associated with the user button activated, and then cause the transmitter to transmit a command data signal that includes the associated command data after the associated delay time has been counted down by the timekeeping circuit. For example, the function performed by the control panel may be the arming of the security system such that the security system is armed after a delay time has expired after the user has pressed the user button.

DETAILED DESCRIPTION OF THE INVENTION

Figure 1:
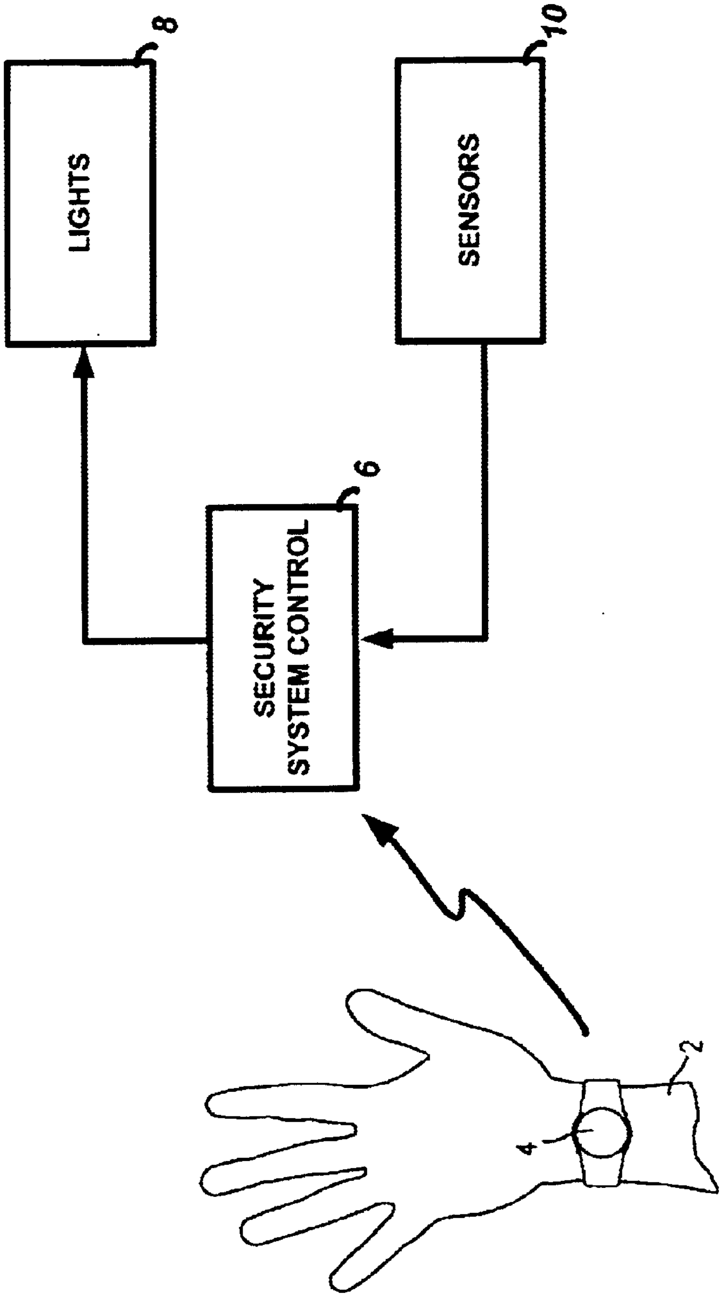
FIG. 1 is a diagram of the basic system of the present invention.

The preferred embodiment of the present invention will now be described. FIG. 1 illustrates in top-level form a wearable timepiece such a wristwatch 4 worn on the wrist of a user 2, which is in wireless communication with a security system control panel 6. The security system control panel is used in conjunction with sensors 10 and output devices such as lights 8, as well known in the art of security systems. As will be explained herein, the timekeeping functions of the wristwatch 4 are used advantageously with the control panel 6 for various functions such as synchronization, automatic issuance of system commands, and system arming delays.

Figure 2:
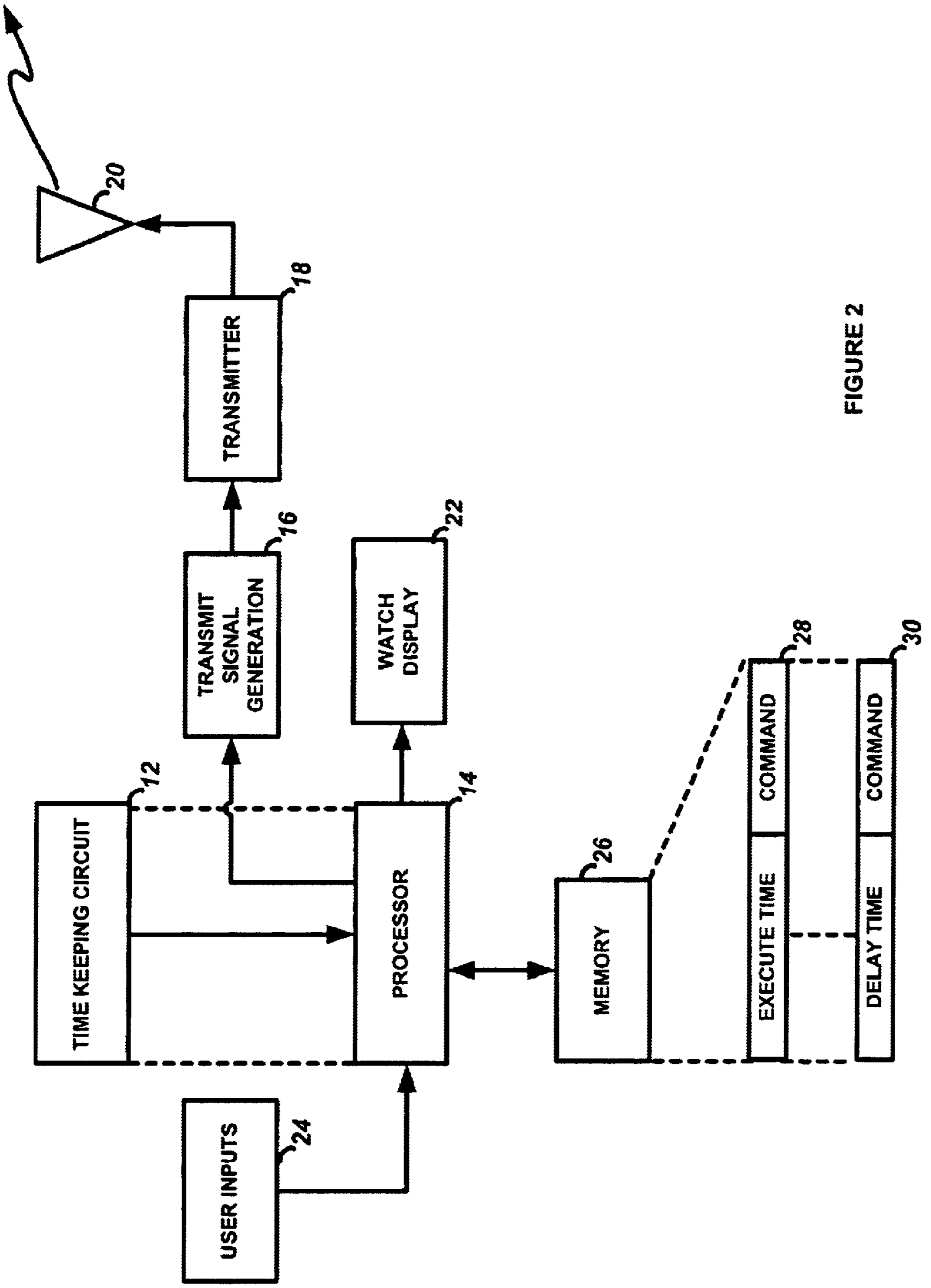
FIG. 2 is a block diagram of the wristwatch timepiece of the present invention.

The circuitry of the wristwatch 4 is shown in the block diagram of FIG. 2. The wristwatch contains a processor circuit, such as a microprocessor or the like, which controls the various functions of the wristwatch (as both a watch function as well as the security system controls to be described herein). A timekeeping circuit 12 is also illustrated, which may be a discrete component or may be integrated as part of the processor function. The timekeeping circuit 12 calculates a time of day and generates a time indicating signal representative of the time of day which provides the timekeeping function of the electronic timepiece. The processor 14 processes the time indicating signal by, for example, passing the time indicating signal to a display 22 such as a liquid crystal display of a digital electronic timepiece, and/or by driving hands on a display dial of a quartz/analog timepiece. The processor 14 may also pass signals to the display 22 to indicate other timekeeping related information such as to display a date, to activate an alarm or to perform setting functions corresponding to the display of the time, the date or the alarm.

The wristwatch also includes a number of user inputs 24, which are typically pushbuttons that are located around the periphery of the face of the watch, as well known in the art. These pushbuttons allow the user to change modes of the watch as desired (e.g. to enter a programming mode, a stopwatch mode, a timesetting mode, etc.). Memory 26, which is of the nonvolatile type, is provided to store various event records in accordance with the functionality of the watch as described herein. In particular, the memory 26 may store event records 28, which contains command data and time data, or it may store event records 30, which contains command data and delay time data, which will be described further below.

The wristwatch also contains a wireless transmitter circuit 18, an antenna 20, and a transmit signal generation function 16. These components operate to allow the wristwatch to send commands in a wireless manner (e.g. via RF communications) to the security system control 6. The transmitter 18 modulates a high frequency carrier, e.g., on about 345 MHz signal carrier, with the (optionally encrypted) data stream to be transmitted to the corresponding security control system. The carrier frequency is preprogrammed or tuned to the intended security control system. Preferably, the transmitter 18 amplifies the modulated signal to a sufficient amplitude to ensure an acceptable range. The transmitter 18 employs an antenna 20 to radiate the modulated electromagnetic radiation into free space. For example, a simple loop antenna may be employed to provide a sufficient operating range for the system. That is, by employing the simple loop antenna, the command data is transmittable to control the plurality of security and control systems.

Figure 3:
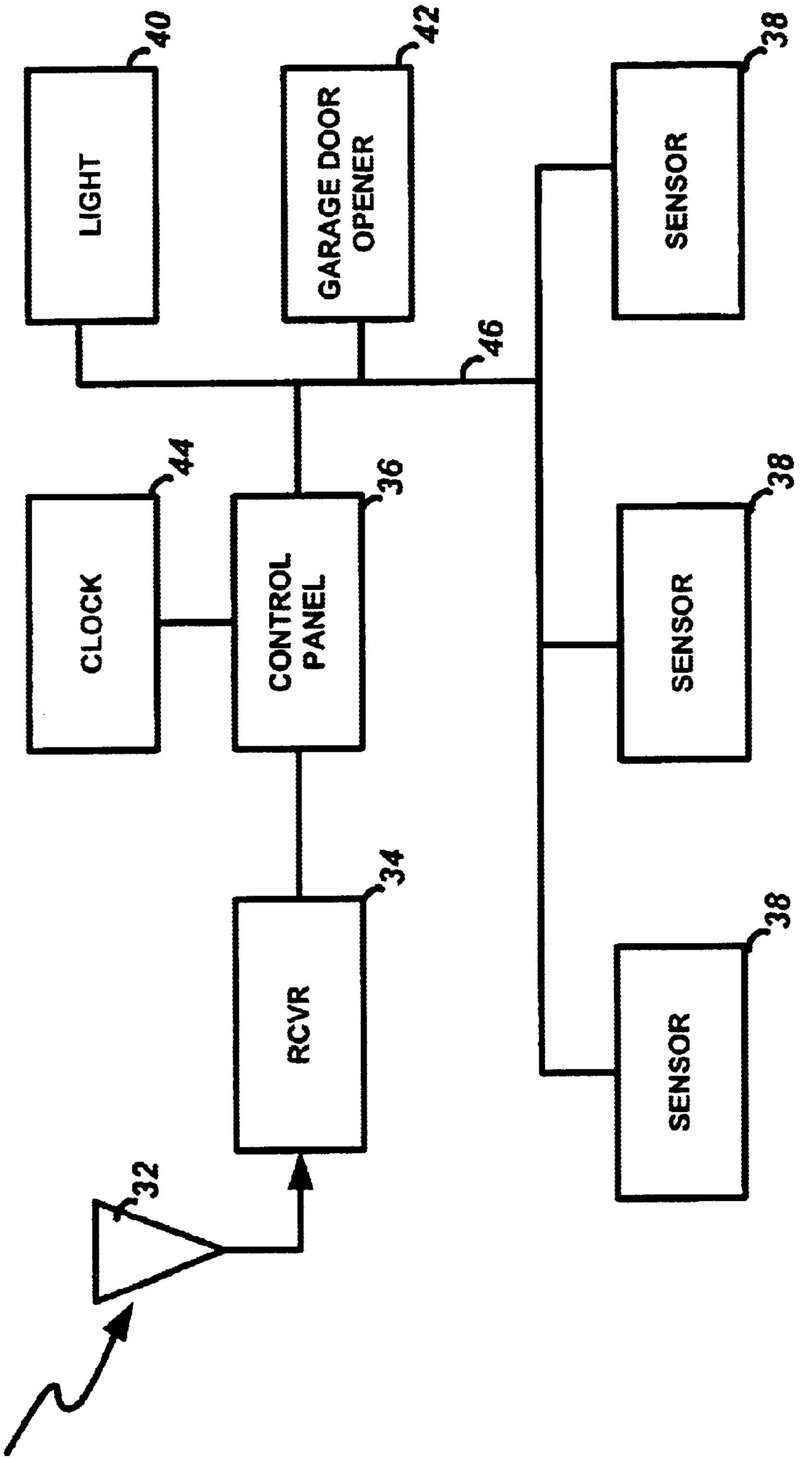
FIG. 3 is a block diagram of the security system of the present invention.

FIG. 3 shows a block diagram of the security system utilized by the present invention. In this system, a wireless receiver 34 and antenna 32 operate to receive the RF signals transmitted by the antenna 20 of the wristwatch. The data is then sent to the control panel 36, which decodes the information and functions accordingly. For example, the data received may command the control panel 36 to arm the security system, it may request the control panel 36 to operate the garage door opener 42 or turn on a light 40. These types of functions are well known in the art of security systems are well known in the art and need not be described further herein. Communications by the control panel with the sensors 38 and other peripherals 40, 42 may be carried out over a data bus 46 as shown in the drawing, or it may operate in a wireless fashion with a transmitter and receiver as well known in the art.

Reference is also made to International Patent Application Number PCT/US00/05862, LEARNING SECURITY CONTROL DEVICE, which is incorporated by reference herein, which describes fundamental aspects of the timepiece utilized by the present invention.

One novel aspect of the invention which is not known in the art is that of using the timekeeping functionality of the wristwatch to synchronize the security system clock 44 via the control panel. The clock is useful for tracking time of events that occur in the system, such as the time that a particular sensor may be triggered, or for recording the time in so-called "guard tour" applications as known in the art.

Synchronization of the clock function 44 in the present invention may be done in either or both if two possible ways;

an automatic synchronization executed automatically by the system at a predetermined time every day, or by operation of a user input button 24 on demand by the user.

The automatic synchronization operates as follows. The processor is programmed to generate a synchronization command on a periodic basis, for example at 12:00 AM every morning. The synchronization command will be processed by the transmit signal generation block 16, transmitted by the transmitter 18, and then received by the receiver 34. The control panel will decode the synchronization command and issue a reset pulse or command to the clock 44, which will automatically reset the clock to the predefined time (which in this case is 12:00 AM). Thus, once every day, the security system clock will be automatically reset to the correct time (as kept by the watch) without need for user intervention. Note that in this mode, the synchronization command need not carry the actual time of day information since the system is configured to perform the reset to the same time on every occurrence of the synchronization.

In the alternative, the system may be programmed to send the time of day information in the synchronization command to the control panel such that the control panel will use this information to set the clock 44 to the time of day indicated thereby. This may of course then be done at any time, since the system will be synchronized to the time indicated in the received command. This type of synchronization may be executed after a user presses a button (or series of buttons) on the wristwatch as desired.

So, for example, if a user wishes to synchronize the system, he may press the appropriate button sequence on the watch, and the processor will use the time of the button press (as determined by the timekeeping circuit 12 and generate a coded signal including the time of day data for transmission by the transmitter 18. The receiver 34 will receive the RF signal, and the control panel will decode the signal to reproduce the time of day information. That data will be used to set the clock 44 to the appropriate time, and the system will be in synchronization with the watch of the user.

A second novel aspect of the invention is that of using the timekeeping function of the watch to trigger predefined events that are stored in the memory 26 of the watch. One or more event records 28 are stored in the memory; each event record 28 includes command data and time data. The time data essentially specifies a time of day (and optionally the day of week or month) that the event defined in the event data should be executed. For example, the time data may specify 11:00 PM, and the event data may specify a code to arm the security system. The processor, operating in a manner known in the art to determine in conjunction with the memory 28 when certain time data matches the time of day as specified by the timekeeping circuit 12, will cause the transmitter 18 to transmit a command data signal that includes the associated command data. The command is received at the security system (assuming that they are in range of each other), and the control panel decodes the command data from the received transmission and operates on it accordingly. Thus, when the command data includes a command to arm the system, the control panel will arm the system as if the user had pressed the appropriate arm command buttons at a keypad console as well known in the art. In this example, this will ensure that a homeowner's security system is armed every night at 11:00, even if he should forget to manually arm the system.

The user can program the event records by using the simple watch interface of the inputs 24 and the display 22 as known in the art (i.e. similarly to programming a watch with an alarm time or calendar entry) or any other means known, such as by entry of data through an input port that may be connected to a computer with a more sophisticated user interface, etc.

Other types of event records may specify the turning off of a light or all lights in a house at bedtime, or turning on certain lights in the morning, setback of a thermostat, etc. All of these functions can be controlled automatically via the wristwatch transmission at the appropriately programmed time. Notably, if the user wearing the watch is outside of the range of the security system (e.g. is away on vacation), then the preprogrammed functions will not be received by the system, even though they have been transmitted by the watch at the correct time. Thus, the functions will not be executed while the user is away. For example, a command to turn on a kitchen light at 6 AM will not be executed in this situation, which is of course a desirable result.

Another advantage in having the command data programmable into the watch is that the user can easily program new commands, or edit or delete existing commands, in the watch, at any remote location, without having to be within reach of the security system. Of course, the watch must be in operating range of the system for the command to be properly executed at the designated time, but programming of the commands may be done on the watch anywhere.

In accordance with a third aspect of the invention, the memory 26 may have user-defined event records 30 that include command data indicative of a command and delay data indicative of a delay time associated with the command. The processor 14 is programmed to determine when a certain user input button 24 has been activated, determine which event record 30 is associated with the user button activated, and then cause the transmitter 18 to transmit a command data signal that includes the associated command data after the associated delay time has been counted down by the timekeeping circuit. For example, the function performed by the control panel may be the arming of the security system such that the security system is armed after a delay time has expired after the user has pressed the user button. Further, the invention can be used to delay the transmission of a panic signal by a predetermined amount, such that the user is given a window of time to cancel the panic transmission (by pressing an appropriate button) before the panic signal is actually sent by the watch.

What is claimed is:

1. A security system comprising:

a) a portable, wrist-wearable timepiece comprising:

a timekeeping circuit for calculating a time of day and for generating a time indicating signal representing said time of day;

wireless transmitter means for transmitting data signals including a time reset signal generated by the timekeeping circuit that does not include time of day information; and processing means adapted to cause the transmitter means to transmit the time reset signal at the same predetermined time every day;

b) a control panel comprising a clock function;

c) a wireless receiver in communication with the control panel for receiving the time reset signal from the wireless transmitting means; and d) a plurality of sensor devices in communication with the control panel;

wherein the control panel is adapted to reset the clock function to the same predetermined time as in the timepiece on the receipt of the time reset signal from the timepiece that is received via the wireless receiver;

whereby the timepiece and the control panel are in time synchronization as a result thereof at the same time every day without having to exchange time of day information.

2. The security system of claim 1 wherein the processing means is further adapted to cause the transmitter means to transmit a time synchronization signal that comprises the time indicating signal and wherein the control panel synchronizes the clock function with the time synchronization signal by setting the clock function to the same time as indicated by the time indicating signal.

3. The security system of claim 2 wherein the time synchronization signal is transmitted after the occurrence of a predetermined event.

4. The security system of claim 2 wherein the timepiece further comprises a user input button, and wherein the time synchronization signal is transmitted as a result of the detection by the processing means of a user selecting the user input button.

5. The security system of claim 1 further comprising:

memory means for storing a plurality of user-defined event records, each of said event records comprising command data indicative of a command and time data indicative of the time that the associated command should be executed; and the processing means is further adapted to:

determine when time data contained in any of the event records matches the time indicating signal and then cause the transmitter means to transmit a command data signal comprising the associated command data;

wherein the control panel is adapted to perform a function specified by the command data received via the wireless receiver.

6. The security system of claim 5 wherein the function performed by the control panel is arming of the security system at a predetermined time specified by the associated time data.

7. The security system of claim 5 further comprising at least one output device in communication with the control panel, and wherein the function performed by the control panel is triggering of the output device at a predetermined time specified by the associated time data.

8. The security system of claim 7 wherein the output device is a light, and wherein the light is turned on by the control panel.

9. The security system of claim 7 wherein the output device is a light, and wherein the light is turned off by the control panel.

10. The security system of claim 1 wherein the timepiece further comprises:

a plurality of user input buttons for triggering associated events by a user; and memory means for storing a plurality of user-defined event records, at least one of said event records comprising command data indicative of a command and delay data indicative of a delay time associated with the command; and wherein the processing means is further adapted to:

determine when a user input button has been activated, determine which event record is associated with the user button activated, and then cause the transmitter means to transmit a command data signal comprising the associated command data after the associated delay time has been counted down by the timekeeping circuit;

wherein the control panel is adapted to perform a function specified by the command data received via the wireless receiver.

11. The security system of claim 10 wherein the function performed by the control panel is arming of the security system, whereby the security system is armed after a delay time has expired after the user has pressed the user button.

12. In a security system comprising a control panel comprising a clock function, a wireless receiver in communication with the control panel, and a plurality of sensor devices in communication with the control panel; a method of resetting the clock function of the control panel to the same predetermined time as a portable, wrist-wearable timepiece comprising the steps of:

the timepiece generating via a timekeeping circuit a time reset signal at the same predetermined time every day, the time reset signal not including time of day information;

the timepiece transmitting via a wireless transmitter the time reset signal at the same predetermined time every day;

the control panel receiving via a wireless receiver the time reset signal; and the control panel resetting the clock function to the same predetermined time as in the timepiece on the receipt of the time reset signal from the timepiece that is received via the wireless receiver;

whereby the timepiece and the control panel are in time synchronization as a result thereof at the same time every day without having to exchange time of day information.

13. The method of claim 12 wherein the timepiece also transmits a time synchronization signal comprising a time indicating signal representing a time of day and wherein the control panel synchronizes the clock function with the time synchronization signal by setting the clock function to the same time as indicated by the time indicating signal.

14. The method of claim 13 wherein the time synchronization signal is transmitted after the occurrence of a predetermined event.

15. The method of claim 13 wherein the time synchronization signal is transmitted as a result of a user selecting a user input button located on the timepiece.

16. The method of claim 13 comprising the further steps of:

the timepiece determining, by reference to a memory that has stored therein a plurality of user-defined event records comprising command data indicative of a command and time data indicative of the time that the associated command should be executed, when time data contained in any of the event records matches the time indicating signal, and then transmitting a command data signal comprising the associated command data;

the control panel performing a function specified by the command data received via the wireless receiver.

17. The method of claim 16 wherein the function performed by the control panel is arming of the security system at a predetermined time specified by the associated time data.

18. The method of claim 16 wherein the security system further comprises at least one output device in communication with the control panel, and wherein the function performed by the control panel is triggering of the output device at a predetermined time specified by the associated time data.

19. The method of claim 18 wherein the output device is a light, and wherein the light is turned on by the control panel.

20. The method of claim 18 wherein the output device is a light, and wherein the light is turned off by the control panel.

21. The method of claim 13 comprising the further steps of:

the timepiece determining when a user input button located on the timepiece has been activated, the timepiece determining, by reference to a memory that has stored therein a plurality of user-defined event records comprising command data indicative of a command, delay data indicative of a delay time associated with the command, and an indication of a user input button associated therewith, which event record is associated with the activated user input button;

the timepiece using the timekeeping circuit to count down the delay time associated with the activated user input button;

the timepiece transmitting a command data signal comprising the associated command data after the associated delay time has been counted down by the timekeeping circuit;

the control panel receiving the command data signal; and the control panel performing a function specified by the command data received from the timepiece.

22. The method of claim 21 wherein the function performed by the control panel is arming of the security system, whereby the security system is armed after a delay time has expired after the user has pressed the user button.

* * * * *